United States Patent Office
3,427,399
Patented Feb. 11, 1969

3,427,399
METHOD OF AND APPARATUS FOR ENCODING AND DECODING CLEAR SIGNAL PULSE SEQUENCES

Kurt Ehrat, Zurich, Switzerland, assignor to Ciba Limited, Basel, Switzerland, a Swiss company Filed Nov. 4, 1965, Ser. No. 506,301
Claims priority, application Switzerland, Nov. 6, 1964, 14,358/64
U.S. Cl. 178—22 16 Claims
Int. Cl. H04l 9/00

ABSTRACT OF THE DISCLOSURE

A method and apparatus for encoding and decoding clear signal pulse sequences the amplitude values of which represent the information by mixing the signal pulse sequences with code pulse sequences of the same type. The mixing is controlled by a sequence of binary pulses in dependence upon a predetermined threshold value.

The invention relates to a method of and an apparatus for encoding and decoding clear signal pulse sequences, such as for example quantized speech signals, and radar signals.

For the purpose of encoding speech signals it has become customary for the speech signal first to be quantized before transmission by periodic sampling, whereupon the individual pulses of the clear signal pulse sequence are mixed with a corresponding pulse of a code pulse sequence, this mixture generally consisting of a simple addition. The code pulse sequences normally have at least as many discrete amplitude values as the clear signal pulse sequences and are of a pseudo-random nature, which means that the pulse amplitudes are distributed satistically and apparently have no relationship with one another, but that they are produced in accordance with definitely reproducible rules. The encoded pulse sequence produced by addition of the clear signal and code pulse sequences is transmited by means of a suitable form of modulation and on reception the clear signal pulse sequence is recovered from the encoded sequence by unscrambling, generally, by simple subtraction, the code pulse sequence necessary for the unscrambling being normally produced in the receiver itself. In this case means must be available for determining the initial condition and synchronising the code pulse sequences. The code pulse sequences are produced in code pulse generators which may be of a mechanical, electro-magnetical, or electronic nature. They have a large number of code forming elements which are variable in state and in mutual relationship, such as for example cam discs, permutation switches, or electronic circuits.

A system of obscuring message signals must in principle fulfill the following conditions:

(1) Each amplitude value of the encoded pulse sequence must occur with equal probability.

(2) The operations for mixing clear signal and code pulse sequences must be definite and reproducible.

(3) The encoded pulse sequence must be so formed that a disturbance in course of transmission does not distort the (uncoded) clear signal more than would be the case with a clear signal transmitted without being encoded.

(4) The amplitude range of the code pulse sequence must be a least equal to that of the clear signal pulse sequence, in order that the clear signals may be sufficiently obscured by the code signals.

(5) Between the clear signals and encoded signals there must be no correlation.

Having regard to the first condition an encoded signal formed by simple addition of a clear signal and a code pulse sequence can scarcely satisfy such an exacting demand. In this simple process in fact there is a preponderance of encoded signals having approximately the same values which are mid-way between the maximum and minimum values obtainable, extremely large and extremely small amplitude values occurring relatively seldom. These values enable simple conclusions to be made with regard to the nature of the clear signal, because a maximum encoded signal amplitude value occurs only in the case of the addition of a maximum clear signal pulse value and of a maximum code pulse value, while a minimum encoded signal amplitude value occurs only in the case of the addition of a minimum clear signal pulse value and a minimum code pulse value. If for example the encoded signal C is formed by addition of clear signal sequences K and code pulse sequence S each having 16 amplitude values (0, 1, 2 . . . 15), the encoded signal amplitude value 30 is obtained only by the addition of $C=K+S=15+15=30$, while $C=0$ permits the assumption of $C=K+S=0+0$.

It has therefore already been attempted to effect additional encoding of the total pulse sequence obtained by addition of clear signal and code pulse sequences in such a manner that each amplitude value of the resulting encoded signal occurs with equal frequency. Thus for example in a previously proposed method the encoded pulse sequence is modified by deducting a limit value $n$ from each encoded pulse, when the later exceeds said limit value which is determined before encoding begins. The rules for the formation of the encoded signal C from the clear signal pulse sequence K and the code pulse sequence S is accordingly as follows in this previously proposed method:

$$C=K+S \text{ when } (K+S)<n$$

$$C=K+S-n \text{ when } (K+S)\geqq n,$$

so that for decoding the rule is:

$$K=C-S \text{ when } (C-S\geq 0$$

$$K=C-S+n \text{ when } (C-S)<0$$

It is true that this method offers the advantage of statistical distribution of the encoded signal amplitude values and thus complies with the first condition, but it fails to satisfy the third condition, according to which disturbances of the encoded signal through the properties of the transmission path must not have any greater effect on the clear signal pulse sequence than would be the case in the event of transmission of the clear signal pulse sequence without encoding. This can be easily explained with the aid of an example.

At a certain moment the clear signal will be assumed to have an amplitude value of 15 and the code signal to have an amplitude value of 2, so that with a limit value $n=16$ the encoded signal is formed in accordance with the above rules as follows:

$$C=K+S-n=15+2-16=1, \text{ since } K+S\ (17)>n(16)$$

If this encoded signal value is now modified by only a single amplitude value in consequence of a slight disturbance on the transmission path, for example by superimposition of an interference pulse peak, that is to say $$C'=C+1=1+1=2$$

on decoding the following will be obtained:

$$K'=C'-S=2-2=0, \text{ since } C-S\geqslant 0$$

whereas in the case of undisturbed transmission the following correct value would have been obtained:

$$K=C-S+n=1-2+16=15, \text{ since } C-S<0$$

The relatively small disturbance of the encoded signal to the extent of a unit amplitude value thus results in an impermissible alteration of the clear signal pulse by 15 unit amplitude values.

The object of the invention is therefore to provide a method which effects the conversion of a pulse sequence into an encoded signal in such a manner that with equally favourable distribution of the encoded signal amplitude values the liability of the clear signal pulse sequence to disturbance is reduced to a minimum.

Accordingly there is provided a method of encoding and decoding clear signal pulse sequences representing information to be transmitted and received comprising;

(a) Pseudo randomly generating a first pulse sequence (b) Generating a second sequence of pulses having a predetermined distribution and representing first and second binary values (c) Mixing each of the pulses in the first sequence with a different one of the clear signal pulses in a manner determined by the occurrence in said second pulse sequence of said first and second binary values according to the following relationships to form an encoded pulse sequence:

$$K+S-A \text{ when } K+S \geqslant A \quad (1)$$

$$K+S+A \text{ when } K+S < A \quad (2)$$

when the first binary value occurs and $$K+S \quad (3)$$

when the second binary value occurs where K is the amplitude value of a clear signal pulse S is the amplitude value of a pulse in said first sequence and A is a predetermined threshold value (d) Transmitting the encoded pulse train (e) Receiving the transmitted pulse train (f) Forming third and fourth pulse sequences identical to the first and second pulse sequences respectively and (g) Mixing the third pulse sequences with the received encoded pulse sequence in a manner determined by the occurrence in the fourth pulse sequence of said first and second binary values to extract the values for K and thus decode said encoded pulse sequence.

There is further provided apparatus for encoding clear signal pulse sequences comprising;

(1) Means for adding each pulse in a clear signal pulse sequence to a different one of the pulses in a pseudo-randomly distributed pulse sequence to form an initial encoded pulse sequence, (2) Means for generating a first sequence of pulses representing first and second binary values, (3) First means for passing the initial encoded pulse sequence to an output upon the occurrence of a second binary value in said first sequence, (4) Second means for adding a predetermined threshold value to each pulse of the initial pulse sequence that does not exceed said threshold value and passing the modified pulse value to said output on the occurrence of a first binary value in said first sequence, and (5) Third means for subtracting said predetermined threshold value from each pulse of the initial pulse sequence that exceeds said threshold value and passing the modified pulse to the output circuit on the occurrence of a first binary value in said first sequence to form an encoded pulse sequence.

In order not to occupy an excessively large band width in the transmission channel, the number of the discrete amplitude values of the clear signal and that of the code pulse sequence are preferably selected to be equal and the threshold value to be equal to the maximum code pulse amplitude.

In order that the invention may be fully understood a preferred embodiment thereof will now be described with reference to the accompanying drawings in which:

FIGURE 1 shows a block diagram of a known coding and decoding installation;

FIGURES 2*a* to 2*c* show the formation of an encoded pulse sequence composed of clear signal and code pulse sequences in the known arrangement;

FIGURE 3 is a diagram of the possible distribution of amplitude values for the encoded pulse sequence shown in FIGURE 2*c*;

FIGURES 4*a* to 4*c* illustrate the previously proposed method referred to above of forming an encoded signal from the total pulse sequence shown in FIGURE 2*c*;

FIGURE 5 is a diagram of the possible distribution of amplitude values for the encoded signal shown in FIGURE 4*c*;

FIGURES 6*a* to 6*d* illustrate a method according to the invention for forming an encoded signal from the total pulse sequence shown in FIGURE 2*c*;

FIGURES 7*a* to 7*d* are diagrams of the possible distribution of amplitude values for the total pulse sequence shown in FIGURE 6*d*;

FIGURES 8*a* and 8*b* are the diagrams shown in FIGURE 7*d* in a different form of representation;

Figure 1:
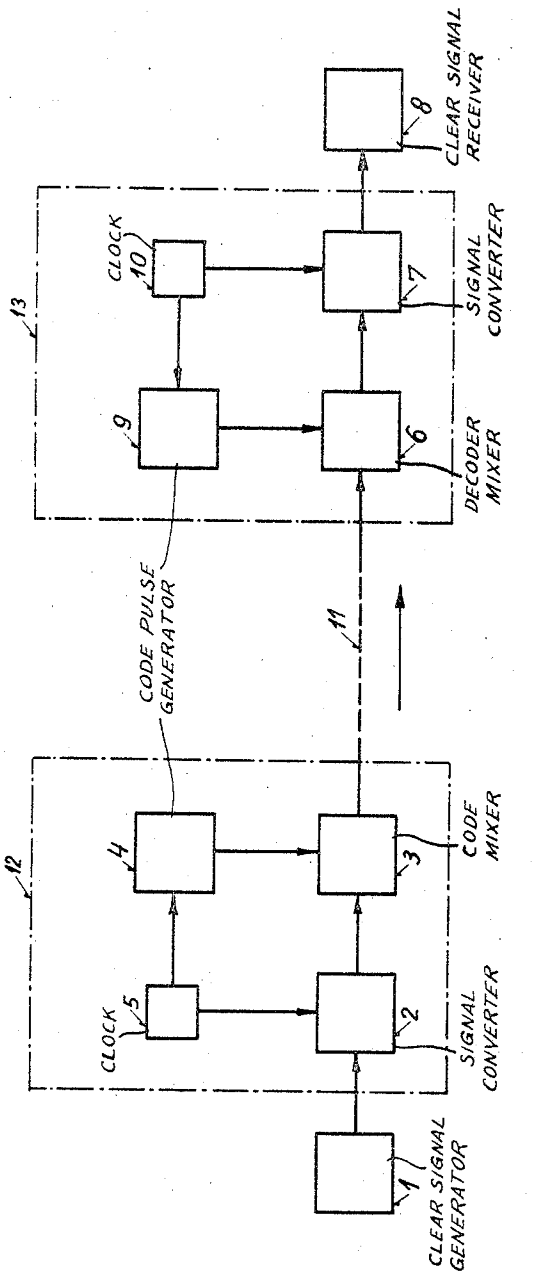

In the encoding and decoding installation illustrated in FIGURE 1, the clear signal generated by the generator 1 passes into the encoding part 12 and is thereupon transmitted as an encoded signal through the line 11 to the decoding part 13, the line 11 being understood to be a wire-connected or wireless transmission path with corresponding modulation units. After decoding in the units 13 the recovered clear signal passes finally into the receiver 8.

The clear signals supplied by the generator 1 (for example speech signals) are converted in a clear information-clear signal pulse converter 2 by periodic sampling into quantized clear signal pulse sequences with a discrete number of amplitude values. In itself, any desired number of discrete amplitude values may thus be selected, but this number is generally restricted by the properties of the transmission channel; the ratio of useful signal to interference signal is here of considerable importance. For embodiments described below, 16 amplitude values will be assumed as an example. If the clear signal already exists in quantized form, it is possible to dispense with the clear information-clear signal pulse converter 2.

The clear signal pulse sequence obtained from the clear information is fed to the encoding mixer 3 and mixed with a code pulse sequence which comprises at least as many discrete amplitude values as the clear signal pulse sequence, this number in the present case likewise being selected to be equal to 16. The code pulse sequence is produced in a code pulse generator 4 by means of, for example, cam discs, permutation switches, and electronic circuits, the pulses comprising the pulse sequences having amplitudes which are distributed statistically and the periods of which are so long that they cannot be determined within a useful period of time even by the most modern means. This type of code pulse sequence is also known as pseudo-random pulse sequence, the expression "pseudo" indicating that their production is reproducible, and thus is effected in accordance with determined arithmetic rules but that in accordance with their character it is possible to distinguish them from genuine random sequences.

The clear information-clear signal pulse converter 2 and the code pulse generator 4 are controlled by means of a clock 5. The encoded signal formed in the encoding mixed 3 in accordance with arithmetic rules which will be explained hereinbelow is modulated in any manner known per se, transmitted through the line 11, demodulated again on the reception side, and fed to the decoding mixer 6, in which the clear signal pulse sequence is recovered from the encoded signal. For the purpose of decoding use is made of code pulse sequences produced in the code pulse generator 9 and exactly coinciding with those of the transmission side.

The criteria utilised for decoding are complicated in comparison with those used for encoding, because in addition it is necessary to take into account possible distortions of the encoded signal by the influences of the transmission properties of the line 11. The clear signal pulse sequence is then fed to the clear signal pulse-clear information converter 7, where the original clear signal is regained and passed to the receiver 8. The code pulse generator 9 and the clear signal pulse-clear information converter 7 are controlled by a clock 10. The clocks 5 and 10 on the transmission and reception sides respectively must in addition be synchronized in relation to one another. Means must also be provided for adjusting identical starting states of the code forming elements on the transmission and reception sides and for enabling the start to be made synchronously, while this adjustment of the initial states must be made in an encoded form. All these measures are however known and not part of the present invention.

Figure 2A:
Figure 2B:
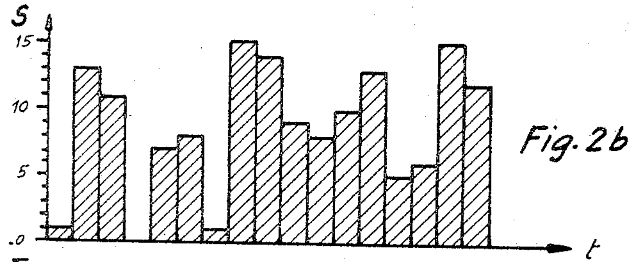
Figure 2C:
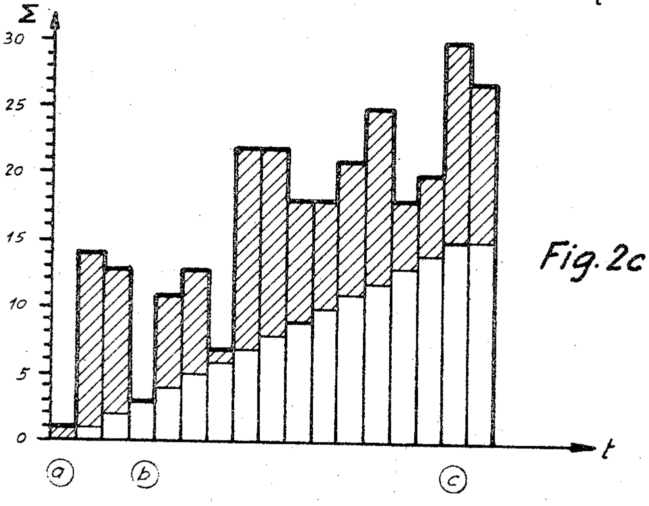

In the encoding mixer 3 the clear signal pulse sequence K and the code pulse sequence S are first added to form a total pulse sequence Σ. This operation is illustrated in FIGURES 2*a* to 2*c*, a step function having 16 amplitude values from 0 to 15 being assumed in the case of FIGURE 2*a* to constitute the clear signal pulse sequence K. The code pulse sequence S is statistically distributed and likewise has 16 amplitude values. The total pulse sequence Σ is illustrated in FIGURE 2*c*, the hatched areas showing the portion of the code pulse sequence.

It can be shown that the total pulse sequence in this form is not suitable as an encoded signal. Thus for example the pulses indicated by *a* and *b* are recognised clearly as "small" clear signal pulse values, and the pulse designated by *c* as a "large" clear signal pulse value. Between the clear signal and total pulse sequences (K and Σ) there is consequently an impermissible correlation, so that a total pulse sequence formed in this manner is not suitable as an encoded signal for secret purposes.

Figure 3:
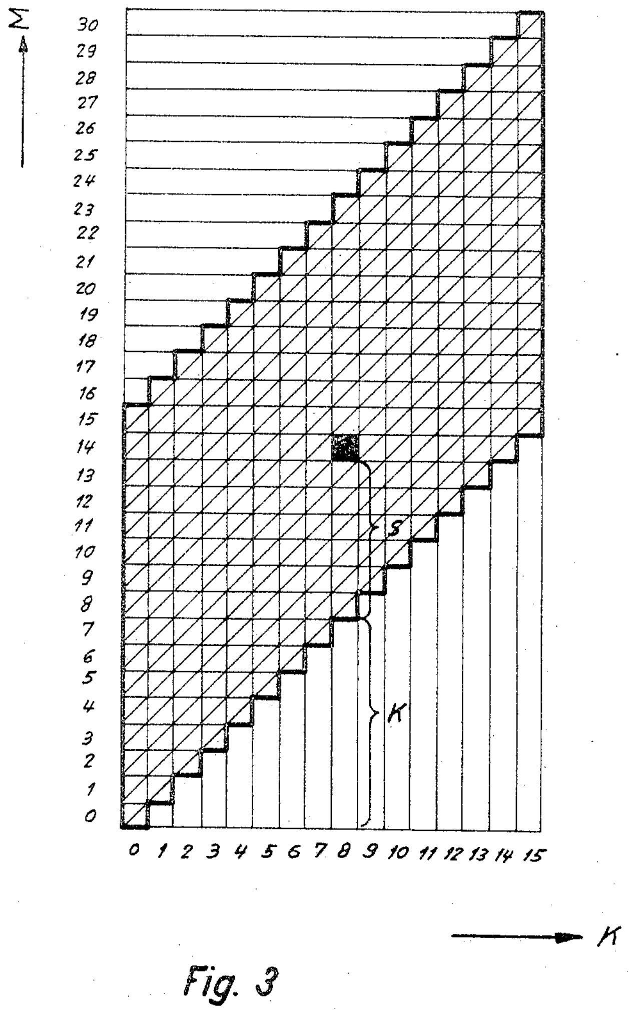

FIGURE 3 illustrates an extension of FIGURE 2*c*, the entire range of the possible code pulse amplitude values being here plotted against each clear signal pulse value. The hatched area thus represents the total of all possible combinations of clear signal and code pulse amplitude values; a signal square in this area symbolizes a distinguished combination. For example the solid black square is obtained by addition of the clear signal pulse $K=8$ to the code signal pulse $S=6{:}\Sigma=K+S=8+6=14$.

If it is now assumed that each clear signal pulse value and therefore every possible combination occurs equally frequently, it can immediately be seen that the mean total pulse values occur considerably more frequently than the extreme values. In the example illustrated in FIGURE 3 the mean total pulse value $\Sigma=15$ can be brought about by 16 different combinations of clear signal and code pulse values, whereas the value $\Sigma=0$ occurs only with $K=0$ and $S=0$, and the value $\Sigma=30$ only with $K=15$ and $S=15$.

Figure 4A:
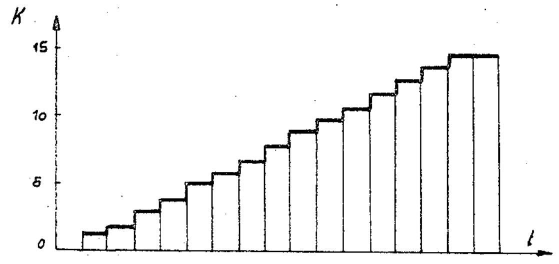
Figure 4B:
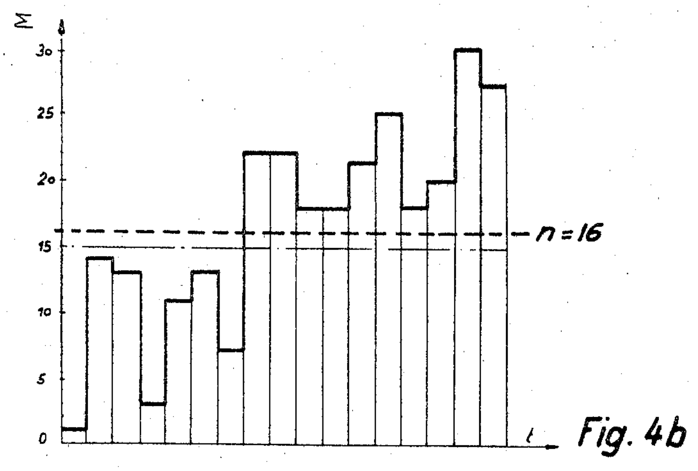
Figure 4C:
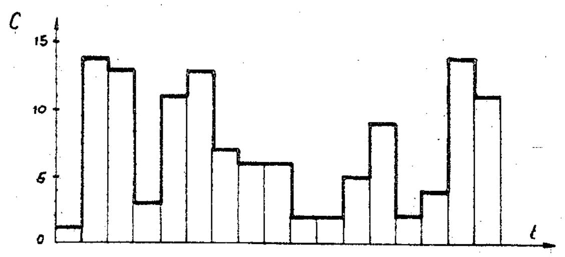

In order to convert the total signal Σ into an encoded signal in which every amplitude value is equally probable, it has been proposed, as has previously been stated, that when a determined limit value *n* is exceeded the amount of this limit value *n* should be deducted from the total pulses. This procedure is shown in FIGURES 4*a* to 4*c* for the total pulse sequence Σ of FIGURE 2*c*, the limit value $n=16$ having been selected. Whereas in FIGURE 4*a* the clear signal pulse sequence K is once again illustrated as a step function and in FIGURE 4*b* the total pulse sequence Σ is again illustrated, FIGURE 4*c* shows the encoded signal C formed in this manner. Even superficial comparison shows that the correlation between the clear signal and code pulse sequence, which can still be seen in the total pulse sequence Σ, has to a large extent disappeared.

Figure 5:
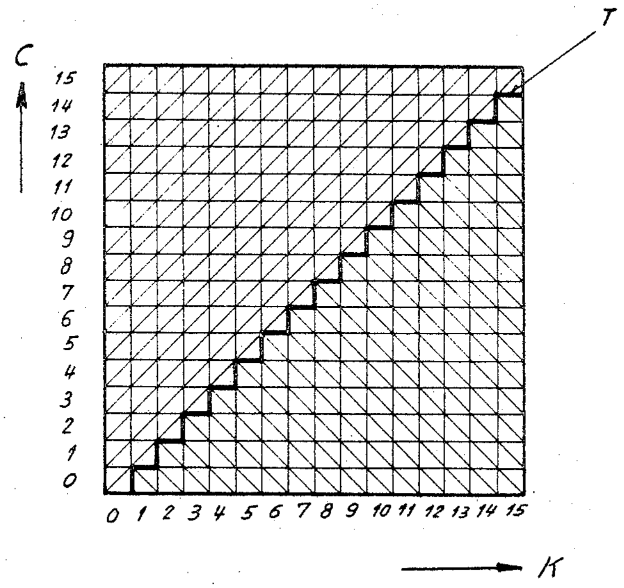

FIGURE 5 illustrates the distribution of all possible amplitude values of an encoded signal formed in this manner and is similar to the illustration in FIGURE 3. On the abscissa the individual clear signal pulse values K are once again plotted, while on the ordinate instead of the total pulse values Σ obtainable by combination with the code pulse values, the encoded values C derived therefrom are now plotted. The values above the staircase line T are brought about, as in the case of FIGURE 3, by addition $C=K+S$, C being in each case smaller than 16; the values below the staircase line are obtained by subtracting the limit values $n=16$ for the values $$\Sigma=K+S(\Sigma\geq 16){:}C=\Sigma-n=K+S-n$$

From FIGURE 5 it can clearly be seen that an encoded signal obtained in this manner now has the desired statistical equal distribution of all amplitude value combinations, independent of the amplitude of the respective clear signal pulse values K.

As had been previously stated hereinabove, this method however has the disadvantage that the clear signal pulse sequence is liable to disturbance in the event of distortions of the encoded signal through the properties of the transmission paths.

According to a preferred embodiment of the present invention the encoded signal is formed from two partial encoded signals in such a manner that the total pulse sequence is at least temporarily taken over unchanged in dependence on an auxiliary code pulse sequence and during the remainder of the time is so modified that the amount of the entire amplitude range of the code pulse sequence is added to the total pulses when they are below a threshold value A, and the amount of the entire amplitude stage range of the code pulse sequence is deducted from the total pulses when the latter attain or exceed the threshold value A. This results in effecting the conversion of the total pulse sequence into the encoded signal in such a manner that, with equally favourable distribution of the encoded signal amplitude values, minimum liability to disturbance of the clear signal pulse sequence can be achieved.

Figure 6A:
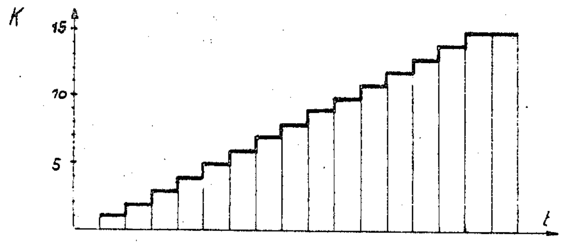
Figure 6B:
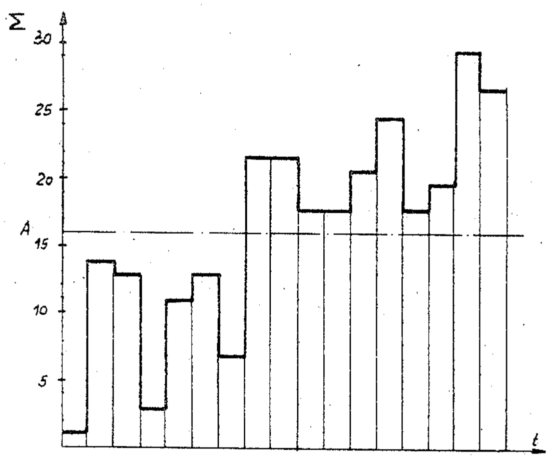
Figure 6C:
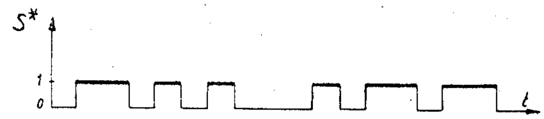

This conversion of the total pulse sequence into the encoded signal to be transmitted is illustrated in FIGURES 6*a* to 6*d*, which once again are based on the clear signal pulse sequence K shown in FIGURE 6*a* which is the same as FIGURE 2*a*, the code pulse sequence S shown in FIGURE 2*b*, and the total pulse sequence Σ shown in FIGURE 6*b* which is the same as FIGURE 2*c*. In order to decide whether the total pulse sequence Σ is to be transmitted unchanged or after modification to the encoded signal, use is made of an auxiliary binary code pulse sequence S*, the values of which are likewise statistically distributed as shown in FIGURE 6*c*. This auxiliary code pulse sequence can be produced in a special generator or by means of the same code generator by which the code pulse sequence S is obtained. In the latter case, additional equipment and synchronisation measures are not necessary.

The arithmetical rules applied in accordance with FIGURES 6*a* to 6*d* for the formation of the encoded signal, assuming that the amplitude ranges for the clear signal and code signal pulse sequences are equal and in each case comprise 16 amplitude values and assuming a threshold value $A=16$, are thus $$S^*=\text{"0"}:\ C'=\Sigma=K+S$$
$$S^*=\text{"1"}:\ C''=\Sigma+16=K+S+16,\ \text{where}\ \Sigma<16$$
$$C''=\Sigma-16=K+S-16,\ \text{where}\ \Sigma\geq 16$$

Figure 6D:
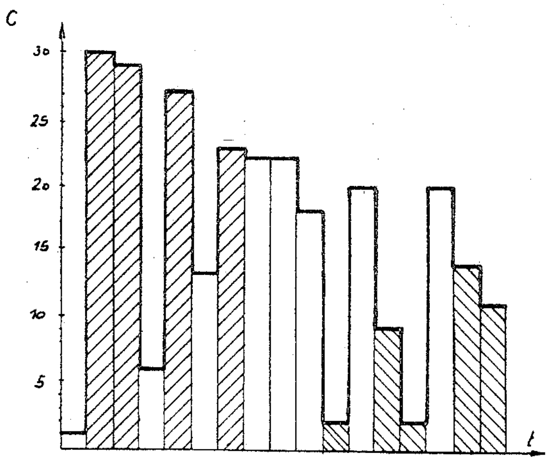

In FIGURE 6*d* the areas hatched diagonally upwards from left to right correspond to the values C″ for Σ<16, the areas hatched diagonally downwards from left to right the values C″ for $\Sigma \geq 16$, while the areas without hatching represent C′. The binary values of S* may be interchanged.

It will be shown below with the aid of FIGURES 7*a* to 7*d* that this form of encoding likewise leads to the desired equal distribution of all amplitude values of the encoded signal.

Figures 7A, 7B, 7C, 7D:
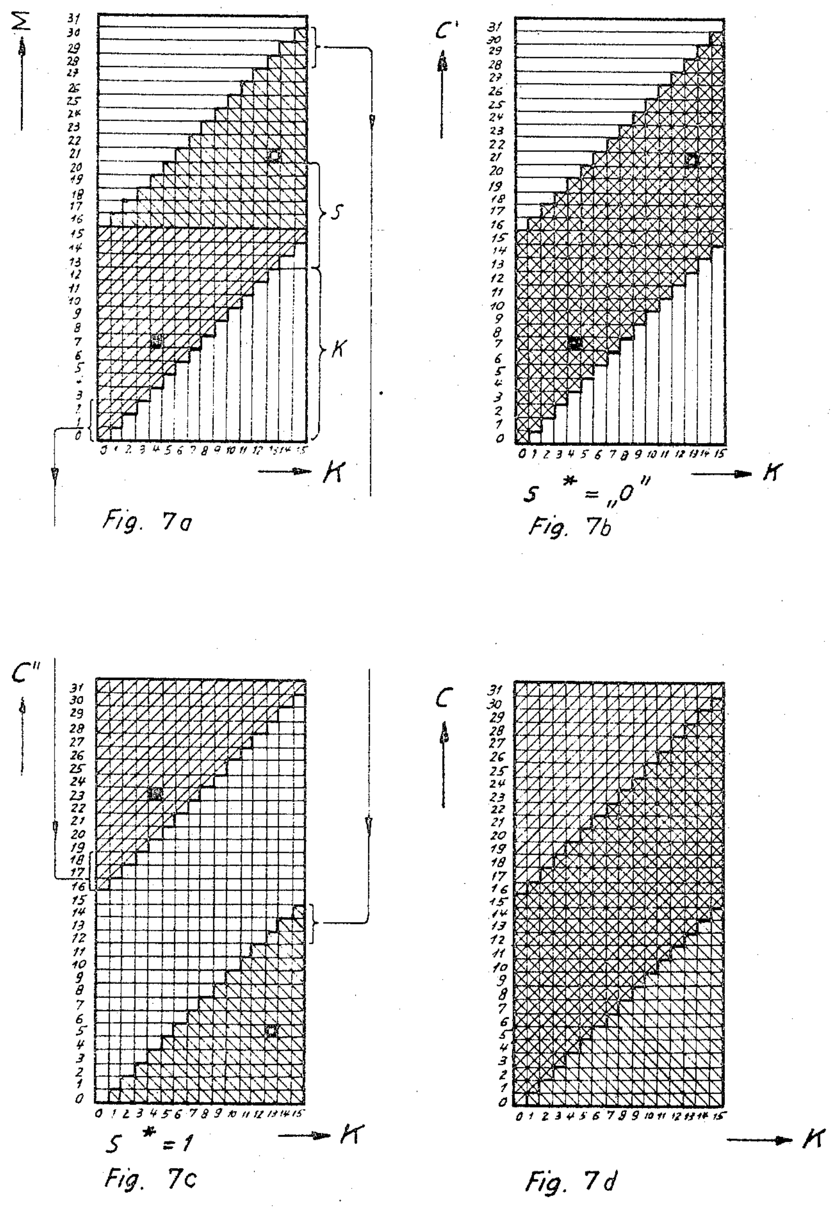

FIGURE 7*a* contains a repetition of FIGURE 3 and shows in the hatched area the range of the possible total pulse values Σ which can occur in the case of simple addition of clear signal and code pulse sequence. Two discrete values are marked and are intended to facilitate hereinbelow the following of the individual arithmetical rules: the square marked by a solid black square is obtained by the addition of $K+S=4+3=7$, and the square marked by a black square by the addition $$K+S=13+8=21$$

In the hatched area FIGURE 7*b* shows the value range of the encoded signal portion C′ when the auxiliary code signal $S^*=$"0". In this case $C'=\Sigma$ so that FIGURES 7*a* and 7*b* are identical.

The region occupied by the possible values of the encoded signal portion C″ in the case $S^*=$"1" is illustrated in FIGURE 7*c*, where C″ is obtained by adding the value $A=16$ to all values $\Sigma<16$, whereas the value $A=16$ is subtracted from all values $\Sigma \geq 16$.

Thus for example for the value $\Sigma=7$ represented by the solid black square we obtain $C''=7+16=23$ and for the value $\Sigma=21$ represented by the black square we obtain $C''=21-16=5$. The encoded signal C illustrated in FIGURE 7*d* is finally obtained by the combination of the encoded signal portions C″ (FIGURE 7*b*) and C″ (FIGURE 7*c*), while it can be seen that the possible encoded signal values actually have the required equal distribution.

Figure 8A:
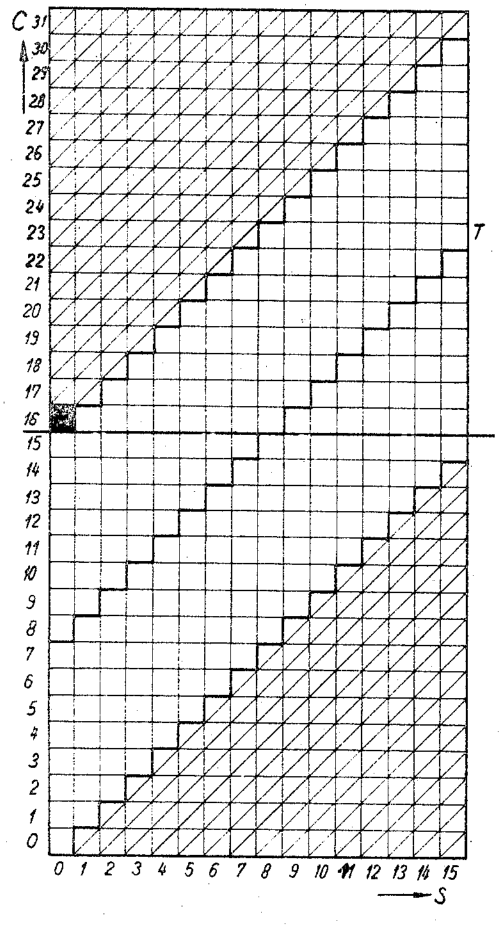

FIGURE 8*a* contains a repetition of FIGURE 7*c*, while however instead of the clear signal pulse values K the code signal pulse values S are now plotted on the abscissa. The arithmetical rules to be applied in the decoding can now be derived without difficulty from FIGURE 8*a*. Whereas on the occurrence of the one auxiliary code signal $S^*=$"0" no difficulties are to be expected in the decoding $(K+C'-S)$, on the occurrence of the other auxiliary code signal $S^*=$"1" there arises the question of the sign in the arithmetical rule to be applied, which is obtained by solving the equation used in the encoding $$(C''=K+S\pm A)$$

in accordance with the clear signal pulse value $K{:}K=C''-S\pm A$. The threshold value A could be used to reach a decision in this respect only if no distortions of the encoded signal were permitted on the transmission path. The source of error which would be inherent in the system with such a method of encoding, and which occurs in the previously proposed system mentioned hereinabove, can easily be shown with the aid of an extreme case, namely the case of the value marked by the solid black source in the column $S=0$: If with $S^*=$"1" and $S=0$ the value $C''=15$ is obtained for example through interference in transmission instead of the correct value 16, in accordance with the above decoding rule the following would necessarily be obtained:

$$K=C''-S+A=15-0+16=31$$

(Since $C''<A=16$) instead of $K=C''-S-A=16-0-16=0$, so that there would be an error of 31 unit amplitude values. The further the encoded signal values are from the threshold value $A=16$, the smaller will of course be the liability of the clear signals to interference.

Since during the encoding the white areas are not occupied on the occurrence of the auxiliary code signal $S^*=$"1," the received encoded signal points lying in this region (with $S^*=$"1") can be regarded as distorted encoded signal points of the upper or lower region as long as they do not exceed the centre line (indicated by the staircase line T) of the white area. The width of the white strip amounts to A, so that accordingly distortions of $A/2$ may be permitted. This is 25% of the maximum amplitude value attainable by the encoded signal in the event of the amplitude ranges of the clear signal and of the code pulse sequences being selected to be equal. In this case the individual distorted encoded values can still be clearly regarded as being "below the staircase line T" or "above the staircase line T." With this staircase line T as criterion as to whether in the case $S^*=$"1" the amount of the entire code pulse value range must be added to or deducted from the encoded signal, the arithmetical rules for the decoding are thus as follows:

For $S^*=$"0" we have $K=C'-S$.
For $S^*=$"1" we have $K=C''-S+A$, where $(C''-S)<A/2$
and $K=C''-S-A$, where $(C''-S)\geqslant A/2$.

Figure 8B:
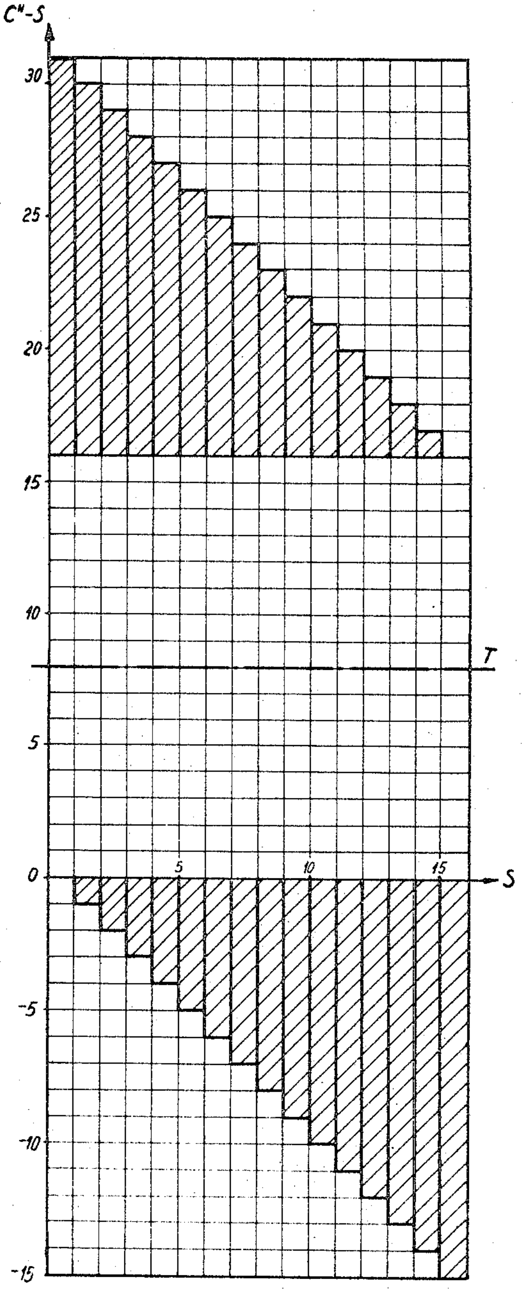

The sense of these arithmetical rules is also made clear in FIGURE 8*b*, where in further development of FIGURE 8*a* the amount $C''-S$ is plotted in the ordinate. The staircase line T has here become a straight line and corresponds to half the threshold value A, $(T=A/2)$. T can thus be used as the new threshold value for the decoding of the encoded signal reduced by the value of the code pulse S.

If greater distortions of the encoded signal than $A/2$ have to be accepted, occasional incorrect decoding may occur, the frequency of which increases in accordance with statistical rules with the increase of the distortions. The tolerance value of the distortions still permissible therefore depends on the quality which the clear signal received and decoded must still have.

Figure 9:
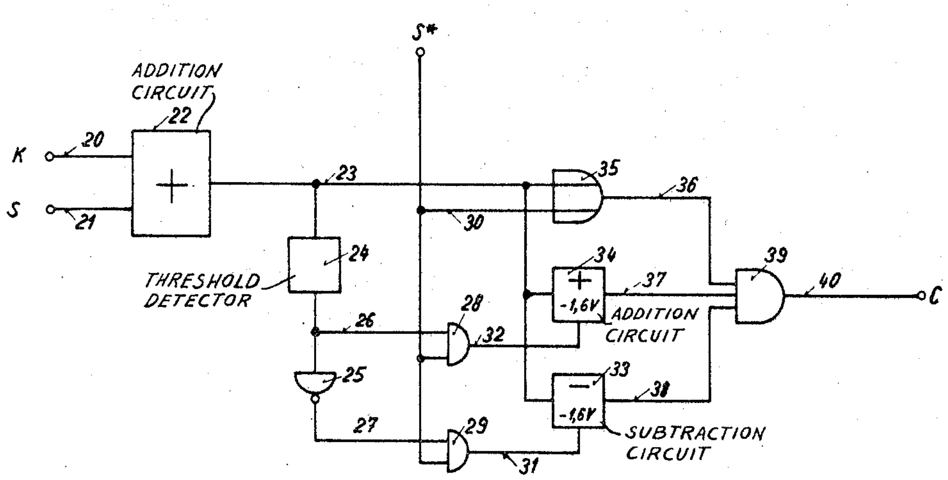
FIGURE 9 illustrates in the form of a block diagram an apparatus for carrying out encoding.

FIGURE 9 shows a circuit arrangement for encoding clear pulse sequences before transmission thereof, and includes an addition circuit 22 to which is applied the clear signal pulse sequence K on line 20 and the code pulse sequence S on line 21. The output of the addition circuit 22 is connected via a line 23 to one input of a two input OR gate 35 whose output is connected via a line 36 to one input of a three input AND gate 39, the output of the latter being connected to a line 40 on which appears the encoded pulse sequence.

The output from the addition circuit 22 is also connected to a threshold detector 24 whose output is connected via line 26 to one input of a two input AND gate 28, and via an inverter 25 and line 27, to one input of a two input AND gate 29. The other inputs of the AND gates 28 and 29 and the OR gate 35 are all connected to an auxiliary code pulse sequence generator which provides the pulse sequence S*.

The output of the AND gate 28 is connected via a line 32 to an add circuit 34 whose output is connected to another input of the three inputs of the AND gate 39 and the output of the AND gate 29 is connected by a line 31 to a subtract circuit 33 whose output is connected to the remaining input of the AND gate 39 by line 38. The add and subtract circuits 34 and 33 respectively are arranged to add or subtract 1.6 v. from the signal on the line 23 when these two circuits have a signal applied on the line 32 and 31 from the outputs of the AND gates 28 and 29 respectively. The value of 1.6 v. represents the threshold value which is added or subtracted as will be explained below by the operation of the threshold detector 24.

In the operation of the circuit shown in FIGURE 9 it is assumed that the individual amplitude values of the pulses in the sequences K and S differ by 0.1 v. and that the amplitude values for K and S extend in each case from 0 v. to −1.5 v. The total pulse sequence Σ occurring on line 23 thus comprises voltage values of 0 v., −0.1 v., −0.2 v. to −3.0 v. The binary auxiliary code pulse sequence S* is represented by the two values "0" (−6 v.) and "1" (0 v.).

The mode of operation of the circuit arrangement will first be explained in the case where in the auxiliary code pulse sequence S* the value "0" occurs ($S^*$="0"). Since the OR gate 35 is connected by the line 23 to the output of the adding stage 22 and by the line 30 to the auxiliary code generator (S*) the more positive of the two input signals in this case the total pulse sequence Σ, is allowed to pass via the line 36 to the AND gate 39. The AND gates 28 and 29 are blocked for $S^*$="0"(−6 v.), while at their outputs a signal appears which blocks the subtraction circuit 33 and the addition circuit 34 respectively. In this case the potential 0 v. appears on the lines 37 and 38, so that of the three inputs of the AND gate 39 only the input 36 has a negative voltage, namely the total pulse sequence Σ, and since moreover the AND gate 39 allows the passage only of the most negative potential in each case at its inputs, the unchanged total signal=$K+S=C'$ ($S^*$="0"), appears at the outlet 40 of the encoding circuit.

If on the other hand the binary value "1" occurs in the auxiliary code pulse sequence S* ($S^*$="1"), the OR gate 35 transmits to the input 36 of the AND gate 39, as the most positive value of its two inputs on lines 23 and 30, the voltage 0 v. of the auxiliary code signal S*. The total pulse sequence Σ continues to pass into the threshold detector 24, which furnishes a potential 0 v. as long as $|\Sigma|<1.6$ v. and which furnishes a second potential −6 v. when $|\Sigma|\geq 1.6$ v. The output of the threshold detector 24 is connected directly to the and gate 28 by way of a line 26 and, by way of an inverter 25 and a line 27, to the AND gate 29. Since it is assumed that at the moment considered $S^*$="1" (0 v.) and hence one input of each of the AND gates 28 and 29 is positive, a signal will appear on the line 32 in the event of the output of the threshold detector 24, which at the same time is the input of the AND gates 28, becoming positive (0 v.) ($|\Sigma|<1.6$ v.), or a signal will appear at the output in the event of the output of the threshold detector 24 becoming negative and thus the input on line 27 of the AND gate 29 becoming positive (0 v.) ($|\Sigma|\geq 1.6$ v.). A signal on the line 31 or on the line 32 effects the opening of the subtraction circuit 33 or of the addition circuit 34 respectively, so that the voltage −1.6 v. is respectively deducted from or added to the total signal $\Sigma=K+S$ on the line 23. In this case one of the two inputs on lines 37 and 38 of the AND gate 39 has a negative voltage, while on the other line 38 or 37, and also on the line 36, the voltage is 0 v. At the output 40 of the encoding circuit there thus appears at $S^*$="1," as the most negative voltage, $C''=K+S+A$ or $K+S-A$ ($A=-1.6$ v.).

Figure 10:
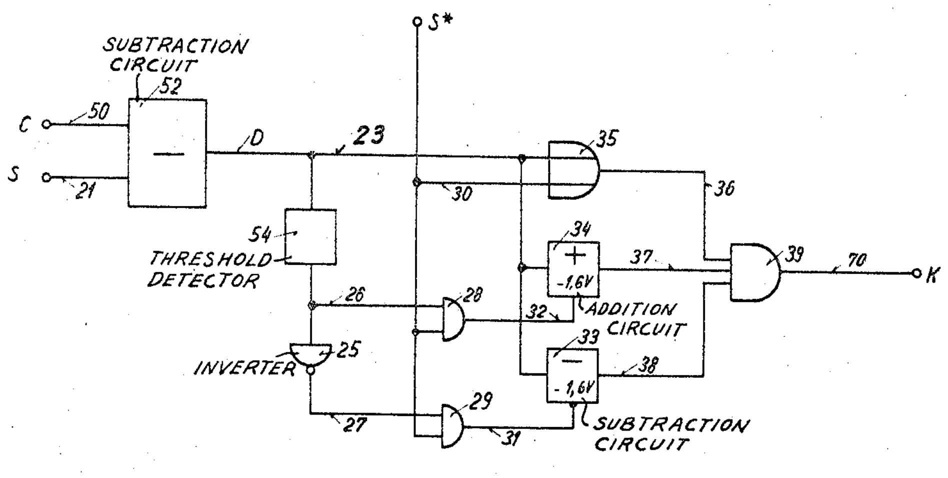
FIGURE 10 illustrates in the form of a block diagram an apparatus for carrying out decoding.

FIGURE 10 shows a circuit for decoding the received encoded signals, said circuit is identical to that illustrated in FIGURE 9 with the exception of the substitution of the circuit 52 for the addition circuit 22 substitution of the threshold detector 54 for the threshold detector 24. The remaining parts of the circuit of FIGURE 10 that are the same as those shown in FIGURE 9 bear the same reference numerals. The encoded signal C of the code pulse sequence S are first applied on the lines 50 and 21 respectively to the subtraction circuit 52 for subtraction ($C-S$).

In the case $S^*$="0", the subtraction pulse sequence D then passes via the line 23, the OR gate 35, and the line 36 into the AND gate 39 and, since the lines 37 and 38 are at the potential 0 v., appears, as the most negative of the three input signals of the AND gate 39, at the output 70 of the latter directly as part of the clear signal pulse sequence K.

In the case of $S^*$="1" on the other hand, the OR gate 35 remains blocked in consequence of the voltage 0 v. at the input S* for all more negative voltages and thus also for the subtraction pulse sequence, while the latter continues to be fed into the threshold detector 54, the latter furnishing a potential 0 v. as long as the subtraction pulses $D>-0.8$ v., but furnishing a second potential −6 v. when the subtraction pulses $D\leq -0.8$ v. The threshold level is here 0.8 v. which is half the threshold level of 1.6 v. previously utilised in connection with the circuit described with reference to FIGURE 9. The provision of a threshold level of 0.8 v. follows the requirements previously referred to upon decoding of the encoded signal. On the occurrence of subtraction pulses $D>-0.8$ v., the AND gate 28 is opened and in the addition stage 34 the voltage −1.6 v. is added to the subtraction pulses D, whereupon via the line 37 and the AND gate 39 the clear signal pulses K appear on the line 70. On the occurrence of subtraction pulses $D\leq -0.8$ v. on the other hand, the AND gate 29 is opened by the inverter 25 via the line 27, and the voltage −1.6 v. is subtracted from the subtraction pulses D in the subtraction stage 33, that is to say the value +1.6 v. is added thereto. Through the line 38 and the AND gate 39 the clear signal pulse values K thus appear at the output 70 of the decoding circuit.

The circuits for the encoding and decoding mixers become particularly simple if the clear signal and code pulse sequences are in binary form.

Figure 11:
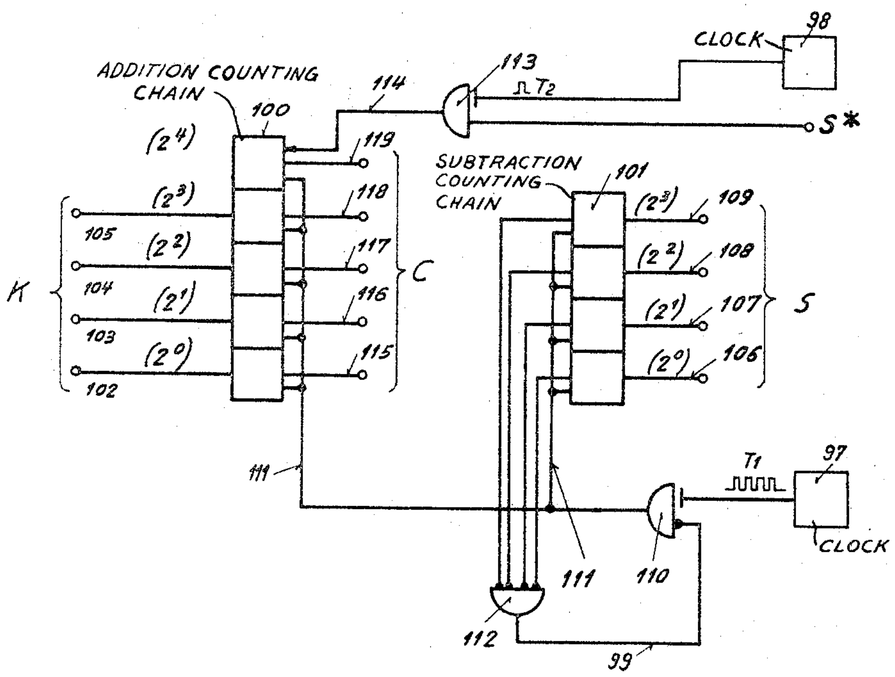
FIGURE 11 illustrates a form of construction of FIGURE 9 for binary coded pulse sequences.

FIGURE 11 illustrates one example of the construction of an encoding mixer working by the binary method in this way. The clear pulse sequence K, which once again is assumed to comprise 16 amplitude values, is first binary encoded in accordance with the values ($2^0$, $2^1$, $2^2$, $2^3$) is fed through the inputs 102, 103, 104, 105 into a five-stage addition counting chain 100. The code pulse sequence S likewise binary coded is fed through the inputs 106, 107, 108, 109 to a four-stage subtraction counting chain 101. The addition counting chain 100 and the subtraction counting chain 101 may be normal binary counters of known construction. As long as all the members of the subtraction counting chain 101 are not at "0," the AND gate 112 remains closed, so that at its output 99 a signal appears which opens the AND gate 110 for a group of timing pulses $T_1$ of a first clock generator 97. These timing pulses $T_1$ effect subtraction in the subtraction counting chain 101 through the line 111, while the amount subtracted is simultaneously added to the clear signal value stored in the addition counting chain 100. When all the members of the subtraction counting chain 101 are at "0," the AND gate 112 is opened, which consequently effects the closing of the AND gate 110, so that no further timing pulses can reach the line 111. At this moment the addition counting chain 100 stores the instantaneous total signal $\Sigma=K+S$ which, when the auxiliary code signal $S^*$="0," can be interrogated with regard to its individual binary amounts through the lines 115, 116, 117, 118, and 119.

The advantage of this circuit is that the addition or subtraction of the 16 amplitude values can be effected in a particularly simple manner for the case $S^*$="1", since through simply switching over the most highly valued stage ($2^4$) of the addition counting chain 100 all the calculation operations necessary for obtaining the encoded signal portion $C''$ can be carried out at the same time.

The information whether the total pulse value exceeds or does not exceed the threshold value 16 can be easily obtained by means of the position of the stage valued at $2^4=16$; a "0" of this stage represents in fact $\Sigma<16$, and a "1" on the other hand designates $\Sigma\geq 16$. The arithmetical rules for obtaining the encoded signal are for values $\Sigma<16$, $C''=\Sigma+16$, and for values of $\Sigma\geq 16$, $C''=\Sigma-16$. Simple switching over of this stage is therefore sufficient. This can be achieved by passing a single pulse $T_2$ of a second clock 98 through an AND gate 113 to the input 114 of this highest addition counting value stage, while the AND gate 113 permits the passage of the pulse $T_2$ only when the corresponding auxiliary code pulse $S$="1".

The encoded signal valued in the binary code and taken from the outputs 115 to 119 must be converted back into an amplitude modulated pulse train before transmission, since the transmission of a signal in binary code is far too liable to interference.

Figure 12:
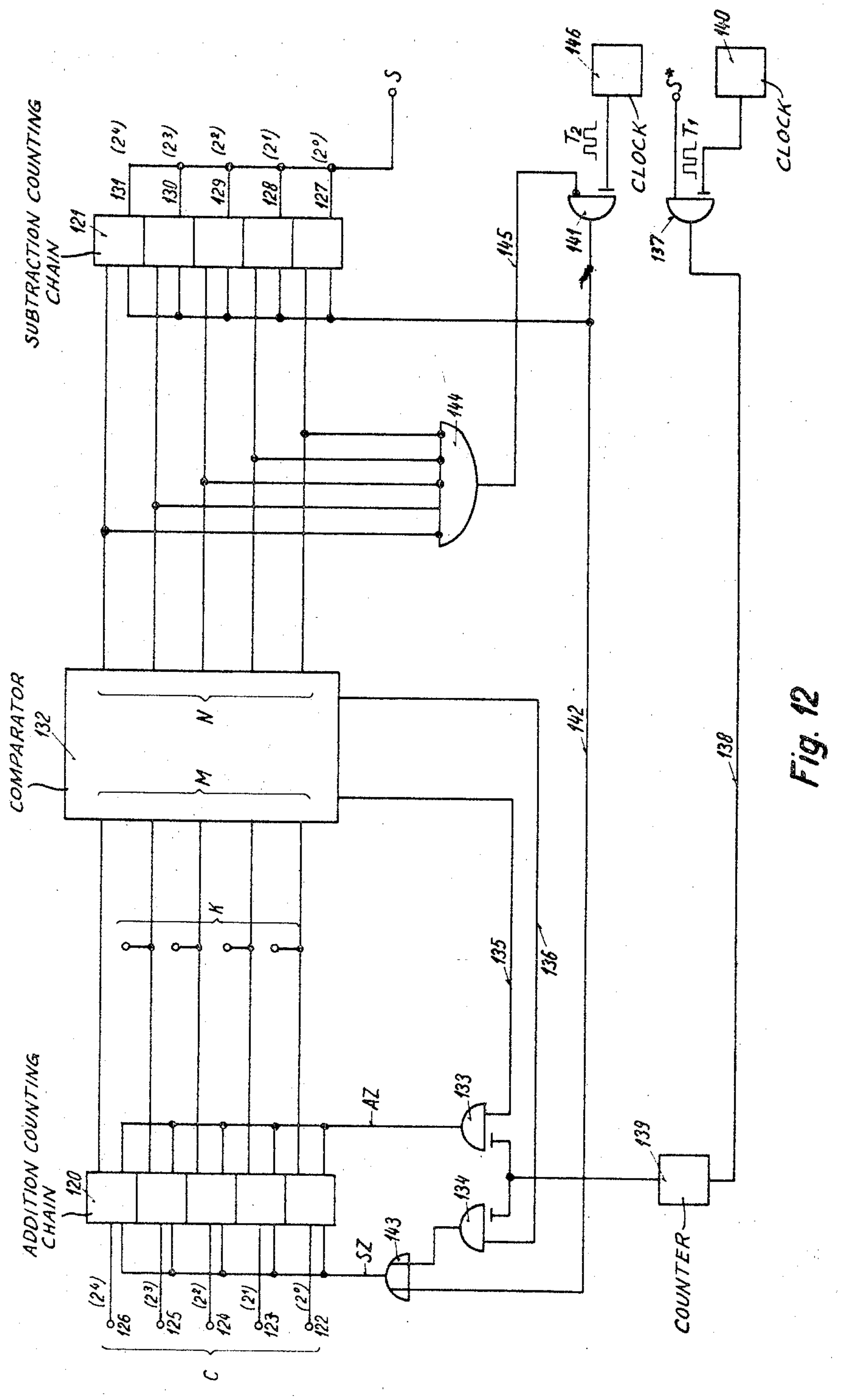
FIGURE 12 shows a form of construction of the apparatus illustrated in FIGURE 10 for binary coded pulse sequences.

The decoding circuit illustrated in FIGURE 12 is essentially of identical construction to the encoding circuit illustrated in FIGURE 11 and as essential components contains once again an addition counting chain 120 and a subtraction counting chain 121. The encoded signal C which in the present case comprises up to 32 amplitude values is valued in the binary code on the reception side and is fed through the inputs 122, 123, 124, 125 and 126 into and stored in the five-stage addition counting chain 120. The code pulse train S converted in accordance with its amplitude values into a number of pulses is fed into the similarly five-stage subtraction counting chain 121 having the inputs 127, 128, 129, 130 and 131, while the subtraction counting chain 121 differs mainly from the subtraction chain 101 in FIGURE 11 in that the value 8 is permanently stored. After introduction of a single code pulse S the subtraction counting chain 121 thus has the number $S+8$. In a first phase $T_1$ the state M of the addition counting chain 120 is then compared with the state N of the subtraction counting chain 121 in a binary counting comparator 132, whereupon in the case $M<N$ the AND gate 133 is opened through the line 135, and in the case $M\geqq N$ the AND gate 134 is opened through the line 136. This comparison corresponds to the previously obtained criteria for deciding the arithmetical rules to be applied to the decoding, while the comparison basis $C\geqq(S+8)$ or $C<(S+8)$ was found by simple conversion from the threshold relationship $(C-S)\geqq A/2$ or $(C-S)<A/2$, with $A/2=8$.

In the case of an auxiliary code pulse $S^*=$"1" the phase $T_1$ now has the effect that through the AND gate 137, the line 138, and the pulse counter 139, 16 timing pulses of a clock 140 are transmitted to the AND gates 133 and 134. Depending on the position of these gates, 16 amplitude values are thus added through the line AZ to the encoded signal value stored in the addition counting chain 120 in the event of the gate 133 being open, or 16 amplitude values are subtracted through the OR gate 143 and the line SZ in the event of the gate 134 being open, so that the value $C+16$ or $C-16$ is now stored in the addition counting mechanism 120.

If on the other hand the auxiliary code pulse amounts to $S^*=$"0", the AND gate 137 remains blocked and the encoded value in the addition counting chain 120 remains unchanged. By means of a second phase $T_2$, which opens the AND gate 141 and feeds a number of timing pulses of a clock 146 into the line 142, the code pulse value S stored in the subtraction chain is now fed through the OR gate 143 and the line SZ into the addition counting chain 120 for subtraction. The AND gate 144, which is blocked in the case of a counting state $N>8$ of the subtraction counting chain 121 and through the line 145 effects the opening of the gate 141, is opened during the second phase as soon as the subtraction counting chain 121 has been subtracted except for the value $N=8$, which effects the blocking of the gate 141 and prevents the introduction of further timing pulses $T_2$ to the line 142. On the closing of the gate 141 the decoding is completed, since the addition counting chain now contains the value $K=C''-S+16$ or $K=C''-S-16$ for $S^*=$"1," or $K=C'-S$ for $S^*=$"0." The clear signal pulse value K can be received directly in binary form at the terminals K of the addition counting chain 120.

The performance of the operations described with reference to FIGURES 11 and 12 requires an accurate programme graduated in respect of time and controlled by means of a central clock unit (not shown in the drawings).

Another advantage of the circuits illustrated in FIGURES 9 to 12, in addition to their simplicity, is the ability to use practically the same circuits for encoding and decoding. Means must merely be provided for reversing the direction of the traffic and bringing the corresponding units into circuits.

What is claimed is:

1. A method of encoding and decoding clear signal pulse sequences representing information to be transmitted and received comprising:

(a) pseudo randomly generating a first pulse sequence,
(b) generating a second sequence of pulses having a predetermined distribution and representing first and second binary values,
(c) mixing each of the pulses in the first sequence with a different one of the clear signal pulses in a manner determined by the occurrence in said second pulse sequence of said first and second binary values according to the following relationships to form an encoded pulse sequence:

$$K+S-A \text{ when } K+S\geqq A \quad (1)$$

$$K+S+A \text{ when } K+S<A \quad (2)$$

when the first binary value occurs and $$K+S \quad (3)$$

where
K is the amplitude value of a clear signal pulse
S is the amplitude value of a pulse in said first sequence, and
A is a predetermined threshold value, (d) transmitting the encoded pulse train,
(e) receiving the transmitted pulse train,
(f) forming third and fourth pulse sequences identical to the first and second pulse sequences respectively, and
(g) mixing the third pulse sequences with the received encoded pulse sequence in a manner determined by the occurrence in the fourth pulse sequence of said first and second binary values to extract the values for K and thus decode said encoded pulse sequence.

2. A method according to claim 1, in which the mixing of each of the pulses in the third pulse sequence with a different one of the encoded pulses is performed according to the following relationships:

(a) $C-S$ when the second binary value in the fourth pulse sequence occurs, (b) $C-S+A$ when $C-S<A/2$
and $C-S-A$ when $C-S\geqslant A/2$ when the first binary value in the fourth pulse sequence occurs, where C is the amplitude value of an encoded pulse.

3. A method according to claim 2, in which the number of different amplitude values that the clear signal pulses and the pulses in the first pulse sequence can take are equal and the first predetermined threshold value is equal to the maximum amplitude that the pulses in the clear signal pulse sequence can take.

4. Apparatus for encoding clear signal pulse sequences comprising, (a) means for adding each pulse in a clear signal pulse sequence to a different one of the pulses in a pseudo-randomly distributed pulse sequence to form an initial encoded pulse sequence,
(b) means for generating a first sequence of pulses representing first and second binary values,
(c) first means for passing the initial encoded pulse sequence to an output upon the occurrence of a second binary value in said first sequence,
(d) second means for adding a predetermined threshold value to each pulse of the initial pulse sequence that does not exceed said threshold value and passing the modified pulse value to said output on the occurrence of a first binary value in said first sequence, and (e) third means for subtracting said predetermined threshold value from each pulse of the initial pulse sequence that exceeds said threshold value and passing the modified pulse to the output circuit on the occurrence of a first binary value in said first sequence to form an encoded pulse sequence.

5. Apparatus as claimed in claim 4, in which said first means includes a two input OR gate for application thereto of said initial pulse sequence and said first and second binary value so that only the initial pulse sequence is passed by said OR gate upon the second binary value being applied to an input thereof, said apparatus further including a threshold detector for providing first and second output signals when the value of a pulse in said initial pulse sequence exceeds and does not exceed respectively said predetermined threshold value in which said second means includes a first AND gate having inputs for application thereto of said second output signal and said first and second binary values and an adding circuit operable to add said predetermined threshold value to a pulse in said initial pulse sequence upon occurrence of a second binary value and said second signal at the inputs of said first AND gate and said third means includes a second AND gate having inputs for application thereto of said first output signal and said first and second binary values and a subtraction circuit operable to subtract said threshold value from a pulse in said initial pulse sequence upon the occurrence of a second binary value and said first signal at the inputs of said second AND gate.

6. Apparatus as claimed in claim 5 including a further AND gate having three inputs to which are connected the outputs from the OR circuit and the outputs from the adding and subtracting circuits.

7. Apparatus for encoding a clear signal pulse sequence comprising, (a) a first counter having a plurality of stages settable to represent the values in binary form of the pulses in the clear signal pulse sequence, (b) a second counter having a plurality of stages corresponding to the stages in the first counter and settable to represent the values in binary form of an encoding pulse sequence, (c) means for adding the contents of the stages in the second counter to the contents of the stages in the first counter, (d) means for interrogating the final count set in the first counter upon a second binary value occurring in an auxiliary coding pulse sequence, and (e) means for setting the highest order stage in the first counter if it is not set after the addition to the first counter of the contents of the second counter and resetting the highest order stage of the first counter if that stage is set after addition of the contents of the second counter to the first counter.

8. Apparatus as claimed in claim 7, in which said adding means comprises, (a) a first AND gate having a plurality of inputs each coupled to a different one of the stages of the second counter, (b) a first clock pulse source, and (c) a second AND gate having an input connected to said first clock pulse source, another input connected to the output of the first AND gate, and its output connected to all the stages of the first counter so that upon the occurrence of a clock pulse from said first source when at least one of the stages of the second counter is set, the contents of the second counter is added to the contents of the first counter.

9. Apparatus as claimed in claim 8 in which setting means comprises, (a) a second clock pulse source, and (b) a third AND gate having an input for receiving the first and second binary values of said auxiliary coding pulse sequence, another input coupled to the second clock pulse generator and its output coupled to the highest order stage of the first counter so that on occurrence of a pulse from the second clock pulse generator and a first binary value of the auxiliary coding pulse sequence, the highest order stage of the first counter is set if it is in its reset state and is reset if it is in its set state.

10. Apparatus for decoding encoded clear signal pulse sequences comprising, (a) means for subtracting each pulse in an encoded pulse sequence from a different one of the pulses in a pesudo-randomly distributed pulse sequence used for encoding the clear signal pulse sequence to provide an initial pulse sequence, (b) means for generating a first sequence of pulses representing first and second binary values corresponding to the sequence used to control the encoding of the clear signal pulse sequence by the pesudo-randomly distribtued pulse sequence, (c) first means for passing the initial pulse sequence to an output upon the occurrence of the second binary value in said first sequence, (d) second means for adding a predetermined threshold value to each pulse of the initial pulse sequence that exceeds half said threshold value and passing the modified pulse value to said output on the occurrence of the first binary value in said first sequence, and (e) third means for subtracting the predetermined threshold value to each pulse of the initial pulse sequence that does not exceed half said threshold value and passing the modified pulse value to said output on the occurrence of the first binary value in said first sequence to form the decoded clear signal pulse sequence.

11. Apparatus as claimed in claim 10, in which said first means includes a two input OR gate for application thereto of said initial pulse sequence and said first and second binary value so that only the initial pulse sequence is passed by said OR gate upon the second binary value being applied to an input thereof, said apparatus further including a threshold detector for providing first and second output signals when the value of a pulse in said initial pulse sequence exceeds and does not exceed respectively half said predetermined threshold value in which said second means includes a first AND gate having inputs for application thereto of said first output signal and said first and second binary values and an adding circuit operable to add said predetermined threshold value to a pulse in said initial pulse sequence upon occurrence of a second binary value and said first signal at the inputs of said first AND gate and said third means includes a second AND gate having inputs for application thereto of said second output signal and said first and second binary values and a subtraction circuit operable to subtract said threshold value from a pulse in said initial pulse sequence upon the occurrence of a second binary value and said second signal at the inputs of said second AND gate.

12. Apparatus as claimed in claim 11 including a further AND gate having three inputs to which are connected the outputs fom the OR circuit and the outputs from the adding and subtracting circuits.

13. Apparatus for decoding an encoded pulse sequence to derive a clear signal pulse sequence comprising, (a) a first counter having a plurality of stages settable to represent the values in binary form of the pulses in said encoded pulse sequence, (b) a second counter having a plurality of stages settable to represent the values in binary form of pulses in a pulse train utilised for encoding the clear signal pulse sequence and a stage for storing a predetermined binary value so that setting of the second counter to a given value results in the counter representing the addition of that given value with the predetermined binary value, (c) means for comparing the contents of the first and second counters, (d) addition and subtraction control means operable in response to said comparing means indicating that the value stored in the first counter exceeds the value stored in the second counter to subtract from the contents of the first counter a value equal to twice the predetermined binary value and to add this value to the contents of the first counter when the latter is less than the contents of the second counter as indicated by said comparing means upon the occurrence of a first binary value in an auxiliary coding pulse sequence used to control the coding of the clear signal pulse sequence by the encoding pulse sequence, (e) and means to subtract the contents of the second counter less said predetermined binary value from the contents of the first counter.

14. Apparatus as claimed in claim 13, in which said addition and subtraction means comprises, (a) a first clock pulse generator, (b) a pulse counter for passing a number of pulses from said clock pulse source equal in number to twice said predetermined binary value, (c) a first AND gate having an input connected to said clock pulse generator, an input for receiving said auxiliary coding pulse sequence and its output coupled to said pulse counter so that on occurrence of said first binary value the pulses from said clock pulse source are fed to said pulse counter, (d) second and third AND gates having their outputs coupled to set and reset respectively the stages in said first counter to effect addition or subtraction thereto and their inputs coupled to said pulse counter and the comparison means so that on the latter providing an indication that either the contents of the first counter is less or greater than the contents of the second counter, the pulses passed by said pulse counter are added to or subtracted from the contents of the first counter respectively and in which said subtraction means includes, (e) a second clock pulse generator, (f) a fourth AND gate having a plurality of inputs each coupled to a different one of the stages of the second counter, and (g) a fifth AND gate having an input coupled to the output of the fourth AND gate, an input coupled to the second clock pulse generator and its output coupled to reset the stages of the first counter to effect subtraction therefrom of the contents of the second register upon occurrence of clock pulses from said second clock pulse generator during the occurrence of the second binary value in the auxiliary coding pulse sequence.

15. Apparatus for encoding a clear signal pulse sequence and decoding said sequence after transmission thereof comprising, (a) a first counter having a plurality of stages settable to represent the values in binary form of the pulses in the clear signal pulse sequence, (b) a second counter having a plurality of stages corresponding to the stages in the first counter and settable to represent the values in binary form of an encoding pulse sequence, (c) means for adding the contents of the stages in the second counter to the contents of the stages in the first counter to provide an encoded pulse for transmission to said decoder, (d) means for interrogating the final count set in the first counter upon a second binary value occurring in an auxiliary coding pulse sequence, (e) means for setting the highest order stage in the first counter if it is not set after the addition to the first counter of the contents of the second counter and resetting the highest order stage of the first counter if that stage is set after addition of the contents of the second counter to the first counter, (f) means for interrogating the contents of the first counter after the highest order stage has been set or reset to provide an encoded pulse for transmission to said decoder, (g) a third counter having a plurality of stages settable to represent the values in binary form of the encoded pulses, (h) a fourth counter having a plurality of stages settable to represent the values in binary form of the pulses in the encoding pulse sequence and a stage for storing a predetermined binary value equal to half the value of the highest order stage in said first counter so that setting of the fourth counter to a given value results in that counter representing the addition of that given value with the predetermined binary value, (i) means for comparing the contents of the third and fourth counters, (j) addition and subtraction control means operable in response to said comparing means indicating that the value stored in the third counter exceeds the value stored in the fourth counter to subtract from the contents of the third counter a value equal to the value represented by the highest order stage in the first counter and to add this value to the contents of the third counter when the latter is less than the contents of the fourth counter as indicated by said comparing means upon the occurrence of a first binary value in the auxiliary coding pulse sequence used to control the coding of the clear signal pulse sequence by the encoding pulse sequence, (k) and means to subtract the contents of the fourth counter less the value represented by the highest order stage in the first counter from the contents of the third counter to provide decoded pulses from the third counter.

16. Apparatus for encoding clear signal pulse sequences and decoding the encoded sequence after transmission thereof comprising, (a) means for adding each pulse in a clear signal pulse sequence to a different one of the pulses in a pseudo-randomly distributed pulse sequence to form an initial encoded pulse sequence, (b) means for generating a first sequence of pulses representing first and second binary values, (c) first means for passing the initial coded pulse sequence to an output for transmission to said decoder upon the occurrence of a second binary value in said first sequence, (d) second means for adding a predetermined threshold value to each pulse of the initial pulse sequence that does not exceed said threshold value and passing the modified pulse value to said output for transmission to said decoder on the occurrence of a first binary value in said first sequence, (e) third means for subtracting said predetermined threshold value from each pulse of the initial pulse sequence that exceeds said threshold value and passing the modified pulse to the output for transmission to said decoder on the occurrence of a first binary value in said first sequence, (f) third means for subtracting each pulse in the pseudo-randomly distributed pulse sequence used for encoding the clear signal pulse sequence from a different one of the pulses in the encoded pulse sequence to provide a second initial pulse sequence, (g) second means for passing the second initial pulse sequence to a decoding output upon the occurrence of the second binary value in said first sequence, (h) third means for adding said predetermined threshold value to each pulse of the second initial pulse sequence that exceeds half said threshold value and passing the modified pulse value to said decoding output on the occurrence of the first binary value in said first sequence, and (i) fourth means for subtracting the predetermined threshold value from each pulse of the second initial pulse sequence that does not exceed half said threshold value and passing the modified pulse value to said decoding output on the occurrence of the first binary value in said first sequence to form a decoded clear signal pulse sequence.

References Cited

UNITED STATES PATENTS

| | | |
|---|---|---|
| 2,836,657 | 5/1958 | Bartelink. |
| 3,229,037 | 1/1966 | Stürzinger et al. |
| 3,278,903 | 10/1966 | Long et al. |

THOMAS A. ROBINSON, *Primary Examiner.*

U.S. Cl. X.R.

179—1.5; 325—32

UNITED STATES PATENT OFFICE
CERTIFICATE OF CORRECTION

Patent No. 3,427,399 February 11, 1969

Kurt Ehrat

It is certified that error appears in the above identified patent and that said Letters Patent are hereby corrected as shown below:

Column 12, line 24, before "where" insert -- when the second beinary value occurs --. Column 16, line 53, "coded" should read -- encoded --. Column 14, line 65, "fom" should read -- from --.

Signed and sealed this 24th day of March 1970.

(SEAL)
Attest:

Edward M. Fletcher, Jr.
Attesting Officer

WILLIAM E. SCHUYLER, JR.
Commissioner of Patents